Figure 1:
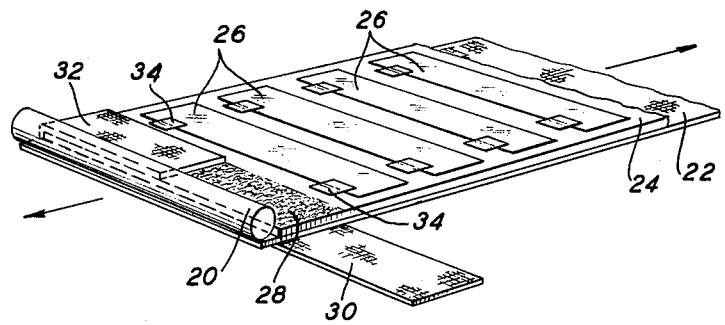

March 1, 1966  M. JORDAN  3,237,647
HEAT INSULATION
Filed May 6, 1963

INVENTOR
MICHAEL JORDAN
BY John W. Haines
HIS ATTORNEY

3,237,647
HEAT INSULATION
Michael Jordan, Orange, N.J., assignor to Air Reduction Company, Incorporated, New York, N.Y., a corporation of New York
Filed May 6, 1963, Ser. No. 278,301
3 Claims. (Cl. 138—128)

This invention relates to arrangements of materials for effective heat insulation and to methods for assembling such arrangements of materials, and more particularly to arrangements and methods for simultaneously reducing the transmission of heat by conduction, convection, and radiation.

An object of the invention is to facilitate the assembly of materials for heat insulation.

A related object is to provide tensile strength in laminated insulation to permit winding the insulation in place under tension while permitting the inclusion of layers of material lacking in tensile strength as well as layers of spaced sheets of material.

A feature of the invention is the use of a continuous sheet of material having high tensile strength relatively to the blanket or mat materials, such as glass wool, commonly employed in assemblages of laminated insulation, the sheet of high tensile strength forming one layer of the resultant assemblage.

Another feature is the use of a continuous sheet of blanket or mat material laid upon and wound with the sheet of high tensile strength, upon which blanket or mat there are placed during the winding process a plurality of radiation barriers, such as sheets of metal foil, separated from each other by spaces to prevent continuous conduction of heat from one radiation barrier to the next.

In accordance with a preferred embodiment of the invention, a three-ply insulative wrapping or assembly is formed from a woven glass cloth sheet on which is superposed a sheet of glass wool on which, in turn, are arranged a series of spaced sheets of aluminum foil. The three-ply wrapping so constituted may be wound convolutely upon the outer wall of a vessel to be insulated. In a double-walled vessel such as a Dewar vessel, the insulating winding may be applied to the outside of the inner wall within the space for the surrounding vacuum jacket. The resultant winding provides a laminar insulation comprising successive layers of glass cloth, glass wool mat and aluminum foil radiation barriers, the layers being repeated in sequence to form a plurality of such three-ply windings.

The glass cloth sheet by warrant of its ability to provide sufficient tensile strength permits suitable tension to be exerted upon the sheet as the insulating covering is wound upon the supporting object. As heretofore used, the glass wool mat does not have the required tensile strength. The foil sheets, hereof, not being continuous in extent, cannot support the tension of winding.

By the term "glass cloth" I mean a fabric woven of fine-spun glass thread, fiber or filament, the said forms of glass having been drawn into thread, fiber or filament form while liquid.

By "glass wool" I mean a fibrous wool-like material composed of fine threads, fibers or filaments of fine-spun glass intermingled or interlaced into a loosely formed mass.

By "foil" I mean metal rolled into very thin pliable sheets or leaves, for example in the case of aluminum foil, sheets preferably thinner than 0.005 inch.

The invention is advantageous in cryogenic uses for reduction of heat transfer into cold materials from the ambient medium and it is also advantageous for uses involving the reduction of heat transfer from hot materials into the ambient medium.

Other features, objects and advantages will appear from the following more detailed description of an illustrative embodiment of the invention, which will now be given in conjunction with the accompanying drawings.

Figure 2:
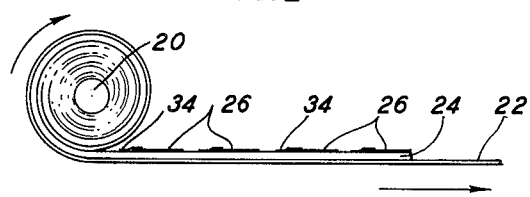

In the drawings:
FIG. 1 is a perspective view of an assemblage comprising laminated insulation, a mandrel, and gettering material preparatory to winding; and
FIG. 2 is an elevational view of an assemblage like that in FIG. 1, shown partially wound.

Referring to the drawings, there is shown a tube or mandrel 20. The insulation comprises a sheet 22 of relatively high tensile strength as well as excellent heat insulating property. For this purpose I find glass cloth to be preferable. To start the winding, the sheet cloth may be secured to the member 20 in any suitable manner. A second sheet 24 of insulation, which may be thicker than the glass cloth but which need not have any material amount of tensile strength, such as glass wool, is laid upon the sheet of glass cloth. On top of the sheet 24 and spaced apart are laid sheets 26 of material which possess good thermal radiation reflective properties, for example aluminum foil. The three layers are wound on the member 20 in one operation while applying tension to the sheet 22 during the winding. When the winding is completed, the end of the sheet 24 may be secured in any suitable manner.

The sheets of foil may be of any desired lengths in the direction of winding, care being taken, however, to see that gaps between adjacent sheets of foil when wound in place do not line up radially so as to form generally radial heat transmission paths that are free from heat radiation barriers in the form of foil sheets. The lengths of the foil sheets may be chosen with relation to the circumference of the winding so that the spaces are staggered. The lengths are not very critical because as the winding progresses, the circumference changes and coincidences of two or more gaps between foil sheets are unlikely to occur in any radial direction.

When the laminated insulation is to be used in a space that will be evacuated, gettering material 28 may be effectively provided as by spreading an even layer of finely divided charcoal adsorbent over a zone of the winding material which will be close to the vessel wall when wound in place.

In a winding process that has been successfully employed, the laminated insulation may be wound either on a mandrel or directly upon a tube, such as an Invar tube for transferring cryogenic liquids. In this process, the sheet 22 of glass cloth is attached to the mandrel or tube 20, as by means of a pressure sensitive adhesive tape 34 such as the tape sold under the trademark "Scotch," and tension is applied as indicated by arrows in FIG. 1 to keep the cloth from sagging. The sheet 24 of glass wool matting is then placed over the glass cloth. The gettering material 28 such as activated charcoal (6–14 mesh, for example) is spread evenly over a zone on the glass wool at the leading end of the matting. This zone is made of a length equal to the circumference of the mandrel or tube. The charcoal should form a coating of single grain thickness with no gaps between the grains. A strip 30 of glass cloth sufficiently wide to cover all the charcoal and of a length twice the width of the winding is then wrapped over the matting with the ends folded over the top to keep the charcoal from falling out. In FIG. 1, one end 32 of strip 30 is shown so folded.

The aluminum foil strips 26 are placed over the remainder of the glass wool matting. In an illustrative case, the strips were laid about ⅜ to ½ inch apart and were about four and one-half inches wide and about ¼ inch shorter than the width of the glass wool matting. The foil strips may be anchored in place if necessary, as by means of the tape pieces 34 at the leading edge of each foil strip.

The mandrel or tube is then turned carefully until the charcoal is wound around it, making certain that the ends of the glass cloth covering the charcoal remain folded over the charcoal.

Next, the tension of the glass cloth is adjusted to give a desired precalculated reduction of the thickness of the glass wool during winding so that the finished thickness of the winding will have a desired predetermined value. The winding then proceeds under tension as indicated by arrows in FIG. 2 until the desired number of turns or the desired thickness of winding is attained. The finished winding may be secured in any desired manner, for example by wrapping it with aluminum foil.

It is desirable to heat the glass cloth and the glass wool before installation in order to decontaminate these materials, and also to heat felt the glass wool to give the glass fibers of the glass wool sufficient cohesion and rigidity to withstand damage from subsequent handling and to reduce resilience in the glass wool which would tend to make the finished winding unwind. These two heating processes may be combined by heating the materials to about 600 degrees Fahrenheit in a vacuum furnace that has been pumped out to a pressure of less than 0.02 millimeter of mercury. It should be noted however that inasmuch as the adsorbent material such as activated charcoal may be damaged by excessive heat and furthermore since such contaminants as residual quantities of bonding material from the glass wool or the glass cloth will destroy the efficacy of the adsorbent if these contaminants recondense upon the adsorbent, it is of great importance that in all cases where the adsorbent is to be incorporated in the winding of insulation the heat felting and decontamination at elevated temperatures be conducted upon the individual components prior to the incorporation of the adsorbent material into the winding. After such heat treatment, the insulation may be assembled including the adsorbent material.

In suitable cases where the adsorbent material is not incorporated in the winding, the heat felting and heat decontaminating may be done after the winding is completed. Later, when the winding so processed is finally installed in a conduit, adsorbent material may be applied in the conduit in known manner.

In any case where charcoal is used, the charcoal must be reactivated to clear it of all gases which it has adsorbed during its exposure to the atmosphere. This may be done in known manner, preferably after the winding has been installed in place in a conduit and during the final evacuation of the vacuum space in which it is to be used.

Windings on mandrels may be transferred to cardboard tubes for storage or directly to tubing upon which they are to be used, being careful in making such transfers not to tear the cloth as on sharp edges of tubing.

The above winding process is readily adaptable to use on tubes of one to five inches or more in diameter. Twenty layers of the laminated insulation may easily be laid down in a winding only one-half inch in thickness exclusive of the space occupied by the charcoal emplacement.

The winding process above described insures close proximity of the charcoal to the conduit wall. This is particularly important in cryogenic uses to obtain a rapid and uniform reduction in pressure upon cooling the conduit.

It will be evident that the invention is not limited to insulating of conduits but may also be used in insulating storage containers and other vessels.

It may be noted that the primary purpose of laminar insulation as used for example in cryogenic storage vessels and liquid transfer lines is to reduce transmission of heat through the insulation in the form of radiation. When vacuum insulation is used, heat transmission through the evacuated space by radiation represents the greatest portion of the total heat leakage. Accordingly, the only component within a laminar insulation system which plays an active role to achieve the reduction of the above-mentioned heat leakage in the form of radiation is the highly reflective shielding material, for example the aluminum foil. The number of active layers of the reflective material is directly related to the amount of reduction of radiation and consequently to the reduction of heat leakage. The thickness of the foil is important as limiting the number of active layers of foil per unit thickness of laminar insulation. The cost of obtaining and handling thin foil must be balanced against the benefits derived from added foil layers. In insulation made in accordance with the invention, thicknesses of aluminum foil in the range from 0.0007 to 0.001 inch have been found advantageous. Material of higher reflectivity than aluminum, for example gold, is more efficient as a radiation shield but the costs are excessive.

The other components of my laminar insulation merely serve as a mechanical support for the reflective foil. The material which separates the adjacent layers of foil is desirably made as non-conductive, thermally, as possible. Vacuum would actually provide the ideal in separation of the layers, but it would involve costly and not very efficient means for supporting the layers of foil.

Glass wool possesses exceptionally good thermal insulation qualities when used in vacuum. Experiments have shown that due to a combination of a number of factors the coefficient of thermal conductivity of glass wool varies wtih the fiber diameter of the wool, the packing density and the pressure. In general, the conductivity will decrease as the fiber diameter becomes smaller. At present, glass wool mats with fiber diameters in the range from 1.0 to 0.76 micron and weights in the range from 0.010 to 0.00332 pound per square foot are available at reasonable cost and are suitable for use in my invention. As manufacturing methods for glass wool are improved, smaller diameter fibers may be expected to prove economical and more efficient. The extreme lack of cohesion of the glass wool of the unbonded type presently available makes evident the need for the third layer in my laminar insulation to permit the application of suitable tension to the insulation during winding.

As hereinbefore described, the winding tension applied to the glass cloth is adjusted to control the thickness of the glass wool to a predetermined value. The initial thickness of the glass wool should preferably be such that when compressed to the desired thickness an optimum packing density of the glass wool in the range from 8 to 8.5 pounds per cubic foot is attained, in which range the thermal conductivity is generally the lowest.

Glass cloth suitable for use as the tension supporting member of my laminar insulation and the means for compressing the glass wool is available with suitable small diameter fibers, for example in the range from 2 to 5 mils diameter, and having tensile strength not less than 70 pounds per square inch.

The use of the third layer in my laminar insulation to provide the necessary tensile strength to the whole has an additional advantage in that it permits the use of an unbonded form of glass wool since no tensile strength is required in the glass wool. The unbonded glass wool requires less baking out of bonding material during evacuation, with the result that a higher degree of vacuum may be attained and the vacuum is more permanent, thereby improving the efficiency of the insulation as it is used in place after installation in the vessel or conduit.

Although as noted above, the number of layers of the metal foil is the important thing and the initial thickness of the glass wool mat is not significant in itself aside from the final thickness and density after winding, final thicknesses of glass wool mats in the range from 0.001 to one-quarter inch may be used. In an illustrative embodiment, glass wool mats of 0.025 inch final thickness have been used.

While illustrative forms of apparatus and methods in accordance with the invention have been described and shown herein, it will be understood that numerous changes may be made without departing from the general principles and scope of the invention.

What is claimed is:

1. A multiple layer heat insulation, said multiple layer heat insulation to be wrapped about a surface to be insulated, said multiple layer heat insulation consisting of three layers of insulating material, a first layer of said three layers consisting of a continuous sheet of glass cloth insulating material the fibers thereof being substantially from 2 to 5 mils in diameter having a relatively high tensile strength, a second layer of said three layers consisting of a continuous sheet of unbonded glass wool having a relatively low tensile strength and having a thickness after wrapping substantially in the range of 0.001 to ¼ inch and compressed after wrapping so as to provide a density substantially in the range of substantially 8 to 8.5 pounds per cubic foot, and the third layer of said three layers consisting of spaced separate sheets of aluminum foil with a thickness substantially in the range of 0.0007 to 0.001 inch, said multiple layer heat insulation including a coating of adsorbent material laid upon said continuous sheet of said second layer over a zone substantially equal to the surface area of said surface to be insulated, said first and second layers wound about said surface to be insulated during said wrapping with said coating adjacent to said surface to be insulated.

2. A multiple layer heat insulation as recited in claim 1, in which said adsorbent material is composed of charcoal grains.

3. A thermally insulated tubular member comprising a tube of substantially circular cross section and a plurality of layers of laminated insulation convolutely wound thereabout, each layer of said laminated insulation consisting of, in inverse succession from the tubular member, an outer continuous sheet of glass cloth made of glass fibers having a relatively high tensile strength and substantially in the range of from 2 to 5 mils diameter, inwardly therefrom a substantially coextensive continuous sheet of unbonded glass wool having a relatively low tensile strength and having a thickness substantially in the range of 0.001 to 0.25 inch, and a density substantially in the range of from 8 to 8.5 pounds per cubic foot, and as the innermost lamination a plurality of circumferentially spaced sheets of aluminum foil having a thickness substantially within the range of from .0007 to .001 inch, the space between adjacent foil sheets being not more than about ½ inch and the circumferential length of said sheets being such that said space between adjacent sheets in one layer is overlapped by a foil sheet in a successive layer to thereby effectively prevent heat transfer by radiation along any radial line while simultaneously effectively preventing heat transfer by conduction through the foil radiation barrier.

References Cited by the Examiner

UNITED STATES PATENTS

| 258,065 | 5/1882 | Hill et al. | 138—105 |
| 2,108,212 | 2/1938 | Schellens | 161—43 |
| 2,514,170 | 7/1950 | Walter et al. | 161—73 |
| 2,675,807 | 4/1954 | Pursel | 128—372 |
| 2,726,977 | 12/1955 | See et al. | 161—113 |
| 3,097,124 | 7/1963 | Denenberg. | |

ALEXANDER WYMAN, *Primary Examiner.*

MORRIS SUSSMAN, EARL M. BERGERT, *Examiners.*